A. GLOVER.
Millstone Corn Crusher.
No. 28,571. Patented June 5, 1860.
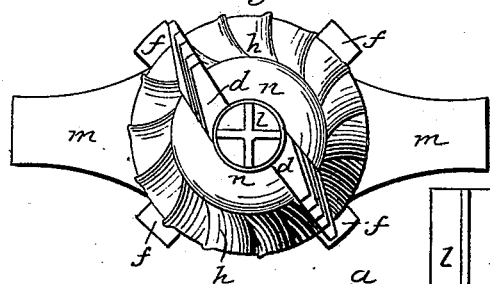
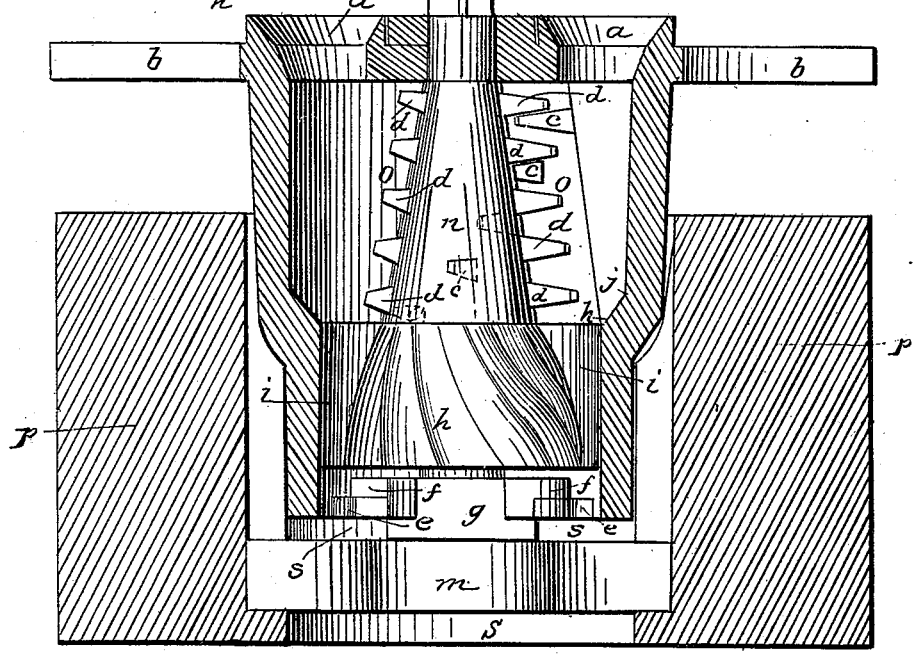
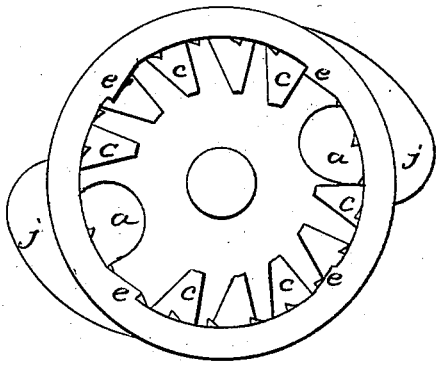
Witnesses:
Inventor:

UNITED STATES PATENT OFFICE.

AMOS GLOVER, OF POWHATAN POINT, OHIO.

CORN AND COB CRUSHER.

Specification of Letters Patent No. 28,571, dated June 5, 1860.

*To all whom it may concern:*

Be it known that I, AMOS GLOVER, of Powhatan Point, in the county of Belmont and State of Ohio, have invented a new and useful machine for reducing corn in the ear and corncobs to meal, called the "Millstone corn crusher," and also a new and improved method of combining crushers with millstones, and do hereby declare that the following is a full and clear description of the same, reference being had to the annexed drawings, making a part of this specification, in which—

Figure 1 is a sectional view of the machine and millstone; Fig. 2, the concave with its belongings viewed from beneath; Fig. 3, the convex with its belongings and attachments viewed from above.

The letter $a$ designates the openings in the top of the machine at which that to be ground or crushed enters; $b$ the parts by which the concave will be fastened; $c$ the teeth in concave; $d$ the teeth in convex; $e$ the raised parts of the concave to hold fast the arms $f$ of bearing $g$; $n$ the convex (or runner); $o$ the concave (or shell); $p$ the corrugated part of convex; $i$ the corrugated part of concave; $j$ the receiving spaces (or enlargements); $k$ the points at which those spaces terminate; $l$ the knocker $m$ the driver; $p$ the mill stone, and $s$ the eye of the stone.

The receiving spaces ($j$) are the parts included between the irregular inside surface of the concave ($o$) and regular circles struck on the inmost points of that surface and are designed to admit the ear or cob into the machine before the revolving teeth ($d$) catch it thereby enabling it to enter though the teeth ($d$) should revolve ever so rapidly. These spaces ($j$) diminish from $a$ to $j$ in the same ratio that an ordinary ear of corn diminishes from butt to point; from $j$ to $k$ they diminish faster, by which faster diminution and their diminution in the direction in which the convex ($n$) revolves the ear or cob is brought in contact with and is caught up by the teeth $d$ and carried around till it meets the teeth $c$, where it is crushed, when it drops between the corrugated surfaces ($h$ and $i$), where it is crushed fine enough to pass between the stones. By a circular arrangement of the teeth $c$ while the teeth $d$ occupy nearly or quite a perpendicular arrangement the ear or cob is crushed gradually which equalizes the resistance. The knocker ($l$), (a winged continuation of the shaft of the convex) ($n$), shakes the hopper. The machine occupies the eye ($s$) of the stone ($p$) and the ends of the driver ($m$) penetrate the walls of the eye ($s$); hence the convex revolves with the stone.

The working machines will be constructed with one or more receiving spaces ($j$) as they are designed to attach to stones grinding with greater or less rapidity, each construction requiring a different arrangement of teeth. The accompanying drawings represent a machine with two receiving spaces ($j$) and a corresponding arrangement of teeth, and designed to work with stones running to the right; to work with stones running to the left the necessary parts will be reversed.

What I claim as my invention and desire to secure by Letters Patent is—

1. The construction of the concave ($o$) with one or more receiving spaces ($j$).

2. Combining crushers with mill stones by means of the driver ($m$) substantially as, and for the purposes, set forth in this specification.

AMOS GLOVER.

Witnesses:
JOHN CUNY,
T. C. THEAKER.